(12) United States Patent
Simon et al.

(10) Patent No.: US 9,994,102 B2
(45) Date of Patent: Jun. 12, 2018

(54) TRANSMISSION HAVING POWER TAKE-OFF

(71) Applicant: Ford Global Technologies, LLC, Dearborn, MI (US)

(72) Inventors: Bernard Simon, Troy, MI (US); Nicholas Brandon Chase, Plymouth, MI (US); Joe Alexander Bousamra, Commerce Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 15/277,256

(22) Filed: Sep. 27, 2016

(65) Prior Publication Data

US 2018/0086200 A1   Mar. 29, 2018

(51) Int. Cl.
| | |
|---|---|
| B60K 17/28 | (2006.01) |
| B60K 25/06 | (2006.01) |
| F16H 1/20 | (2006.01) |
| F16H 57/021 | (2012.01) |
| F16H 57/025 | (2012.01) |
| F16H 61/00 | (2006.01) |

(52) U.S. Cl.
CPC ............. B60K 17/28 (2013.01); B60K 25/06 (2013.01); F16H 1/20 (2013.01); F16H 57/021 (2013.01); F16H 57/025 (2013.01); F16H 61/0025 (2013.01)

(58) Field of Classification Search
CPC .. B60K 17/28; B60K 25/06; B60K 2025/065; F16H 1/20; F16H 1/206; F16H 57/021; F16H 57/023; F16H 57/025; F16H 61/0025
See application file for complete search history.

(56) References Cited

U.S. PATENT DOCUMENTS

| | | | | |
|---|---|---|---|---|
| 3,046,813 | A | | 7/1962 | Bixby |
| 4,120,374 | A | * | 10/1978 | Heisig ................. B60K 17/28 180/53.1 |
| 4,136,751 | A | * | 1/1979 | Poore ................... B60K 25/06 180/53.8 |
| 4,435,990 | A | * | 3/1984 | Chalmers ............. B60K 17/28 192/85.09 |
| 4,579,183 | A | * | 4/1986 | Irikura ................ B60K 17/105 180/307 |
| 4,727,759 | A | * | 3/1988 | Yamaoka .............. B60K 17/28 74/15.2 |
| 4,785,682 | A | * | 11/1988 | Nishimura ............ B60K 17/28 74/15.66 |
| 4,824,128 | A | * | 4/1989 | Takagi ................. B60K 17/02 180/365 |

(Continued)

FOREIGN PATENT DOCUMENTS

WO    2007108805 A1    9/2007

*Primary Examiner* — Laura Freedman
(74) *Attorney, Agent, or Firm* — James Dottavio; Brooks Kushman P.C.

(57) ABSTRACT

A transmission includes a primary drive gear fixed to an input shaft and an idler gear meshing with the primary drive gear. A transmission pump is arranged to receive power from the idler gear. A power take-off unit is mounted to a case of the transmission and includes an input shaft having a first gear meshing with the idler gear and a second gear. An output shaft has a third gear meshing with the second gear.

18 Claims, 2 Drawing Sheets

(56) References Cited

U.S. PATENT DOCUMENTS

| | | | | |
|---|---|---|---|---|
| 4,856,355 A * | 8/1989 | Ishimaru | ............... | B60K 17/08 |
| | | | | 74/11 |
| 4,938,085 A * | 7/1990 | Suzuki | ................... | B60K 17/28 |
| | | | | 74/15.2 |
| 5,211,064 A * | 5/1993 | Betz | ....................... | B60K 25/06 |
| | | | | 74/15.66 |
| 5,267,477 A | 12/1993 | Irikura et al. | | |
| RE34,833 E * | 1/1995 | Hasegawa | ............ | B60K 17/105 |
| | | | | 180/53.1 |
| 5,511,436 A * | 4/1996 | Hasegawa | .............. | B60K 17/00 |
| | | | | 74/331 |
| 6,223,848 B1 * | 5/2001 | Young | ................ | B60K 17/105 |
| | | | | 180/242 |
| 6,363,815 B1 * | 4/2002 | Ishimaru | ............... | B60K 17/04 |
| | | | | 475/198 |
| 6,564,891 B2 * | 5/2003 | Ishii | ...................... | B60K 17/28 |
| | | | | 180/53.1 |
| 6,634,459 B1 | 10/2003 | Litkenhus et al. | | |
| 6,758,112 B2 * | 7/2004 | Ishii | .................... | B60K 17/105 |
| | | | | 180/53.8 |
| 6,758,301 B2 * | 7/2004 | Shiba | ................... | B60K 5/1208 |
| | | | | 180/291 |
| 7,163,077 B2 * | 1/2007 | Hasegawa | ............ | B60K 17/105 |
| | | | | 180/292 |
| 7,617,892 B2 * | 11/2009 | Nishimoto | ............. | B60K 17/08 |
| | | | | 180/305 |
| 7,765,884 B2 | 8/2010 | Frait et al. | | |
| 9,097,329 B2 | 8/2015 | Viitasalo et al. | | |
| 9,132,725 B2 | 9/2015 | Barnes | | |
| 9,371,000 B2 * | 6/2016 | Goleski | ................... | F16H 47/08 |
| 9,783,049 B2 * | 10/2017 | Frait | ..................... | B60K 17/02 |

\* cited by examiner

TRANSMISSION HAVING POWER TAKE-OFF

TECHNICAL FIELD

This disclosure relates to the field of automatic transmissions for motor vehicles. More particularly, the disclosure relates to a transmission having at least one power take-off.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. Transmission speed ratio is the ratio of input shaft speed to output shaft speed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising.

Most transmissions are equipped with a torque converter or other type of launch device. When the vehicle is stationary or moving very slowly, the gearbox input speed is less than the minimum operating speed of the engine. A launch device transmits torque from the engine to the gearbox input while permitting the engine to rotate at an acceptable speed. A torque converter includes an impeller driven by the engine and a turbine driving the gearbox input. Torque is transferred from the impeller to the turbine hydrodynamically.

Some types of vehicles need substantial amounts of power to run accessories in addition to the power required to propel the vehicle. These vehicles may use one or more accessory drive units, which may be called power take-off (PTO) units, mounted to the transmission to provide this accessory power. If the accessory drive is connected to the turbine, then it only rotates when the vehicle is moving. Although this is acceptable for some types of accessories, other types of accessories require power when the vehicle is stationary.

SUMMARY

According to one embodiment, a transmission includes a case, an input shaft, a primary drive gear fixed to the input shaft and having a first set of gear teeth, and an idler gear having a second set of gear teeth in meshing engagement with the first set of gear teeth. A transmission pump is disposed in the case and includes a drive gear having a third set of gear teeth in meshing engagement with the second set of gear teeth to transmit power from the idler gear to a transmission pump. A power take-off unit (PTU) is mounted to the case and includes a PTU input shaft and a PTU output shaft. A first unit gear is disposed on the PTU input shaft and has a fourth set of gear teeth in meshing engagement with the second set of teeth to transmit power from the idler gear to the PTU input shaft. A second unit gear is disposed on the PTU input shaft and has a fifth set of gear teeth. A third unit gear is disposed on the PTU output shaft and has a sixth set of gear teeth in meshing engagement with the fifth set of gear teeth to transmit power from the PTU input shaft to the PTU output shaft.

According to another embodiment, a transmission includes a primary drive gear fixed to an input shaft and an idler gear meshing with the primary drive gear. A transmission pump is arranged to receive power from the idler gear. A power take-off unit is mounted to a case of the transmission and includes an input shaft having a first gear meshing with the idler gear and a second gear. An output shaft has a third gear meshing with the second gear.

According to yet another embodiment, a transmission includes a case defining a window and having a boss surrounding the window. A primary drive gear is fixed to a transmission input shaft. A transmission pump is operably coupled to a pump gear. An idler gear meshes with the primary drive gear and the pump gear. An accessory drive unit is mounted to the boss and includes an input shaft having a first gear meshing with the idler gear and a second gear. An output shaft has a third gear meshing with the second gear.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
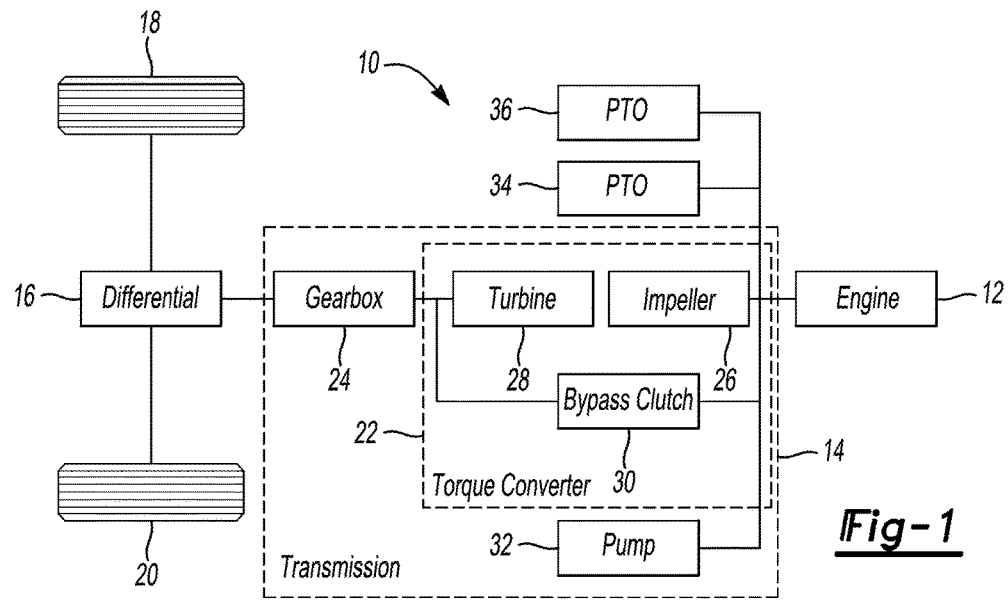
FIG. 1 is a schematic diagram of a vehicle powertrain having a transmission with two accessory drives.

An example vehicle powertrain 10 is illustrated schematically in FIG. 1. In FIG. 1, solid lines represent mechanical connections such as shafts or fixed ratio gearing. The engine 12 generates mechanical power by burning fuel. The transmission 14 transmits the power to a differential 16 at a shaft speed suited to current vehicle needs, which may be faster or slower than the shaft speed at which engine 12 generates the power. The differential 16 reduces the shaft speed by a fixed final-drive ratio and transmits the power to the left and right driving wheels 18 and 20, allowing for slight speed differences between the wheels as the vehicle turns a corner.

The transmission 14 may include a torque converter 22 or other launch device and a gearbox 24. The torque converter 22 includes an impeller 26 that is fixed to the engine crankshaft and a turbine 28 that is fixed to the gearbox input shaft. Torque is transferred hydro-dynamically from the impeller 26 to the turbine 28 when the impeller 26 rotates faster than the turbine 28. A bypass clutch 30 may be engaged to transfer torque by friction from the impeller 26 to the turbine 28 to reduce the power loss inherent in the hydrodynamic power transfer. The gearbox 24 includes a number of hydraulically actuated shift elements. The gearbox 24 establishes different speed ratios by engaging various subsets of the shift elements. The transmission pump 32 provides pressurized fluid that engages the shift elements. Some of the power generated by engine 12 is used to drive the transmission pump 32, reducing the power delivered to the differential 16. In order to maximize the percentage of power delivered to the differential 16 and thus reduce the amount of fuel consumed by engine 12, it is desirable to minimize the power consumption of transmission pump 32.

Power take-off units (PTO) 34 and 36 are power consuming devices added by vehicle operators, dealers, and OEMs. The power take-off units are also known as accessory drives. The PTOs are mounted to the transmission structure using mounting hardware that may be provided by the transmission manufacturer. The PTOs 34 and 36 are powered by the engine 12 indirectly through the transmission 14. Some types of accessories require power only when the vehicle is moving, other types require power only when the vehicle is stationary, and yet other types require power in both circumstances.

For example, the vehicle engine can provide power for various accessories at remote worksites by way of vehicle-mounted electric generators, hydraulic pumps, and air compressors. These accessories are only utilized when the truck is in park. A vehicle-mounted refrigeration compressor must work while the vehicle is travelling and while the vehicle is parked. When a truck is used for snow removal, a transmission-mounted PTO may provide the power to raise and lower the snowplow. The driver would like to be able to raise and lower the plow while moving, while stopped with the vehicle in gear, and while in park.

Figure 2:
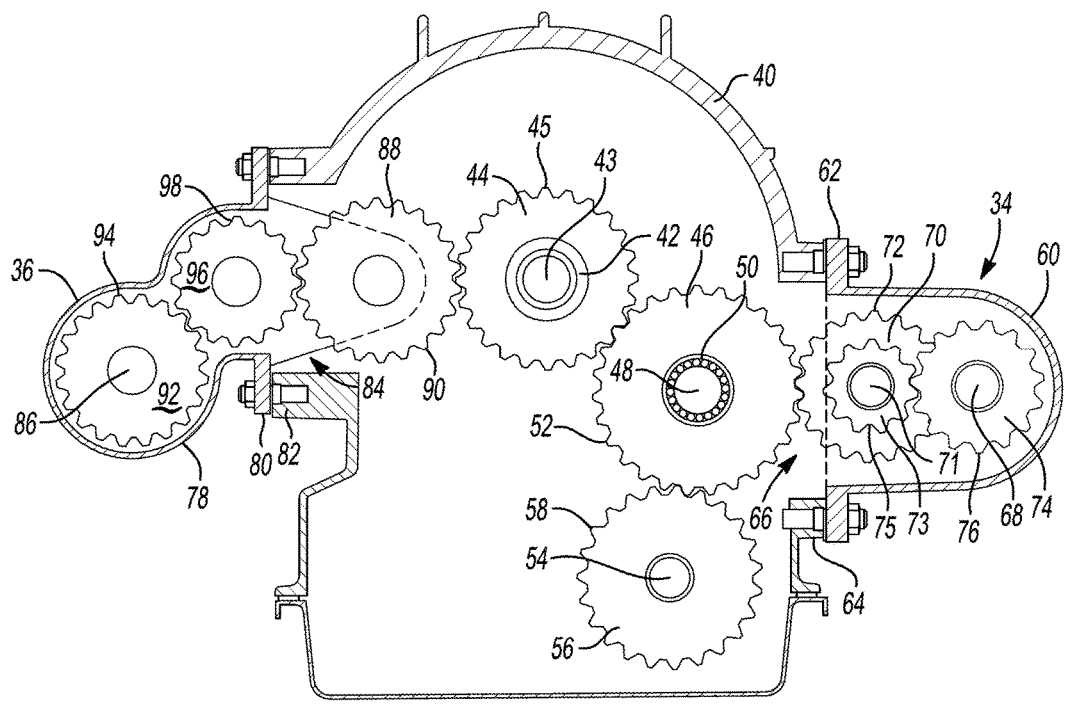
FIG. 2 is a schematic front view, in cross section, of the transmission and accessory drives of FIG. 1 along a cut line behind the torque converter.

Referring to FIG. 2, the transmission 14 includes a transmission housing (or case) 40 that may be one or more pieces assembled together. The torque converter 22 is located at the front of the transmission 14 and is disposed within a bell housing that is either attached to the housing 40, or is an integral part of the housing. The torque converter 22 includes the impeller 26 coupled to the crankshaft of the engine 12 and the turbine 28 connected to a turbine shaft 43. The turbine shaft 43 drives the gear box that includes one or more planetary gear sets and an arrangement of shift elements (e.g., clutches and brakes) controlled by a valve body. A stator is disposed between the impeller 26 and the turbine 28.

A primary drive gear 44 is fixed on an input shaft 42 (powered by the engine) and includes gear teeth 45. The primary drive gear 44 is for powering the transmission pump 32, and the first and second PTOs 34, 36 (if installed). A first idler gear 46 is supported on a first idler shaft 48 supported by the transmission housing 40. A bearing 50 may be disposed between an inside bore of the gear 46 and the outer surface of the shaft 48. The gear 46 includes gear teeth 52 in meshing engagement with the gear teeth 45 of the primary drive gear 44 in order to transmit power from the input shaft 42 to the idler gear 46.

The transmission pump 32 may be an off-axis pump that is located at the lower-right side of the transmission 14 when looking from the front of the transmission. The transmission pump 32 includes a drive gear 56 fixed to a pump shaft 54 that powers the pump 32. The drive gear 56 has gear teeth 58 in meshing engagement with the gear teeth 52 of the idler gear 46 to transmit power from the idler gear to the pump shaft 54. In an alternative embodiment, one or more additional idler gears may mesh between gear 46 and the pump gear 56 to transmit power to the pump shaft 54.

The PTO 34 includes a housing 60 having flanges 62 that bolt onto bosses 64 of the transmission housing 40. The transmission housing 40 defines a window 66 allowing the gears of the PTO 34 to mesh with the gears inside the transmission housing 40. The PTO 34 includes an input shaft 71 and an output shaft 68 that are each supported for rotation within the PTO housing 60. The input shaft 71 may be completely within the housing 60 and not with the transmission case 40. The input and output shafts may be substantially parallel to each other and located side-by-side. In one or more embodiments, a first unit gear 70 is disposed on the input shaft 71 and includes gear teeth 72 in meshing engagement with the gear teeth 52 of the idler gear 46. The gear 70 is fixed on the shaft by a spline connection or other type of connection known in the art. A second unit gear 73 is also disposed on the input shaft 71 and fixed on the shaft by a spline or other type of connection known in the art. Gear 70 and gear 73 may be concentric with each other. Gear 70 may having a larger diameter than gear 73. A third unit gear 74 is fixed on the output shaft 68 and includes gear teeth 76 in meshing engagement with the gear teeth 75 of gear 73 to transmit power from the input shaft 71 to the output shaft 68. The output shaft 68 is operably coupled with an accessory and provides the driving force for the accessory. The accessory may include a clutch that selectively couples the shaft 68 with the accessory.

In another embodiment, the gear 70 and gear 73 may be combined into a single gear having a pair of gear teeth axially spaced from each other to enable each of the gear teeth to mesh with different gears. Here, the combined gear may be disposed on a stationary shaft with a bearing positioned therebetween allowing free rotation of the combined gear relative to the shaft.

The idler gear 46 is arranged in the case 40 such that the gear 46 meshes with a gear of the PTO 34 when the PTO is installed. For example, the idler gear 46 is disposed adjacent the window 66 on a same longitudinal half of the transmission 14 as the PTO 34. The idler gear 46 is preferably located near the window to reduce the reach-in length of the PTO 34. The transmission 14 and PTO 34 are configured such that unit gear 70 meshes with the idler gear 46 when the PTO 34 is mounted to the transmission case 40. The unit gear 70 transmits power from the idler gear 46 to the input shaft 71. Unit gear 73 transmits power from the input shaft 71 to unit gear 74, which in turn transmits power to the output shaft 68 to power the accessory. The transmission housing 40 may include a cover that fastens to the bosses 64 when the PTO 34 is not installed.

The PTO 36 includes a housing 78 having flanges 80 that bolt onto bosses 82 of the transmission housing 40. The transmission housing 40 defines a window 84 allowing the gears of the PTO 36 to mesh with the gears inside the transmission housing 40. The PTO 36 includes an output shaft 86 that is powered by the engine. The shaft 86 is operably coupled with an accessory and provides the driving force for the accessory. A unit gear 92 is fixed to the shaft 86 and includes gear teeth 94. The PTO 36 may include one or more additional unit gears that operably couple with the primary drive gear 44 to transmit power from the primary drive gear 44 to the shaft 86. In one embodiment, the PTO 36 includes a first idler gear 88 and a second idler gear 96. The first idler gear 88 includes gear teeth 90 in meshing engagement with the gear teeth 45 of the primary drive gear 44. The second idler gear 96 includes gear teeth 98 in meshing engagement with gear teeth 94 and gear teeth 90.

In other embodiments, more or less idler gears may be used to transmit power from the primary drive gear 44 to the shaft 86. For example, the PTO 36 may include a single idler gear meshing with the primary drive gear 44 and the unit gear 92. The gears 88, 92, and 96 are disposed on shafts supported by the PTO housing 60. The transmission housing 40 may include a cover that fastens to the bosses 82 when the PTO 36 is not installed. (While bearings are only illustrated on gear 46, it is to be understood that other gears may also include bearings.)

The first PTO 34 and the second PTO 36 receive power via the input shaft 42. Therefore, the PTOs 34, 36 are able to power their associated accessories whenever the engine is running, regardless of whether the vehicle is moving or stationary. Power is also available regardless of whether the gearbox is in neutral, park, reverse, or a forward gear.

The gears of the transmission and the PTOs are arranged such that all gears are loaded regardless of whether or not each of the PTOs 34, 36 are installed. In some prior art designs, an idler gear was unloaded when one or more of the PTOs were uninstalled. When unloaded, idler gears may rattle or move creating unwanted noise that is detectable by passengers of the vehicle. This noise leads to an unsatisfactory customer experience and should be avoided. In the illustrated design, the first idler gear 46 is always in meshing engagement with a gear configured to power the transmission pump 32. Thus, when the PTO 34 is removed, the idler gear 46 is still loaded, which prevents gear rattle and other unwanted noise. The illustrated gear arrangement also reduces the number of gears required to power each of the various components by providing a shared idler gear 46 for the transmission pump 32 and the PTO 34. This shared idler gear reduces weight, costs, and power losses.

Other sources of gear rattle are also eliminated by supporting gear 70 and gear 88 with PTO housing 60 and PTO housing 78, respectively. Thus, gear 70 and gear 88 are only present in the transmission when their associated PTO is installed. By positioning the idler gear 46 adjacent to the window 66 and using an oversized diameter for gear 70, the reach-in distance of the PTO 34 can be reduced to reduce weight and cost of the PTO. As illustrated, the center of gear 70 and the input shaft 71 are completely contained within the PTO 34 and are outside of the housing 40. By using a pair of gears (or a combined gear) on a common axis to transmit power from the idler gear 46 to gear 74, the diameter of gear 70 can be chosen based on packaging considerations and the diameter of gear 73 can be chosen based on gear ratio considerations.

The PTO 34 has a modular design allowing for the gear ratio between the input shaft 71 and the output shaft 68 to be changed by swapping gear 73 and gear 74 with gears having a smaller or larger diameter. This allows the PTO 34 to be used with a variety of different accessories having different power, torque, and speed requirements.

Providing a pair of gears on the input shaft 71 also enables more compact packaging of the PTO 34 because gear 70 and gear 74 can overlap each other to reduce the width of the PTO 34. When a single idler gear is used in the PTO, the idler gear and the drive gear are in meshing engagement and cannot overlap each other. This can increase the size of the PTO depending on the desired gear ratio.

Figure 3:
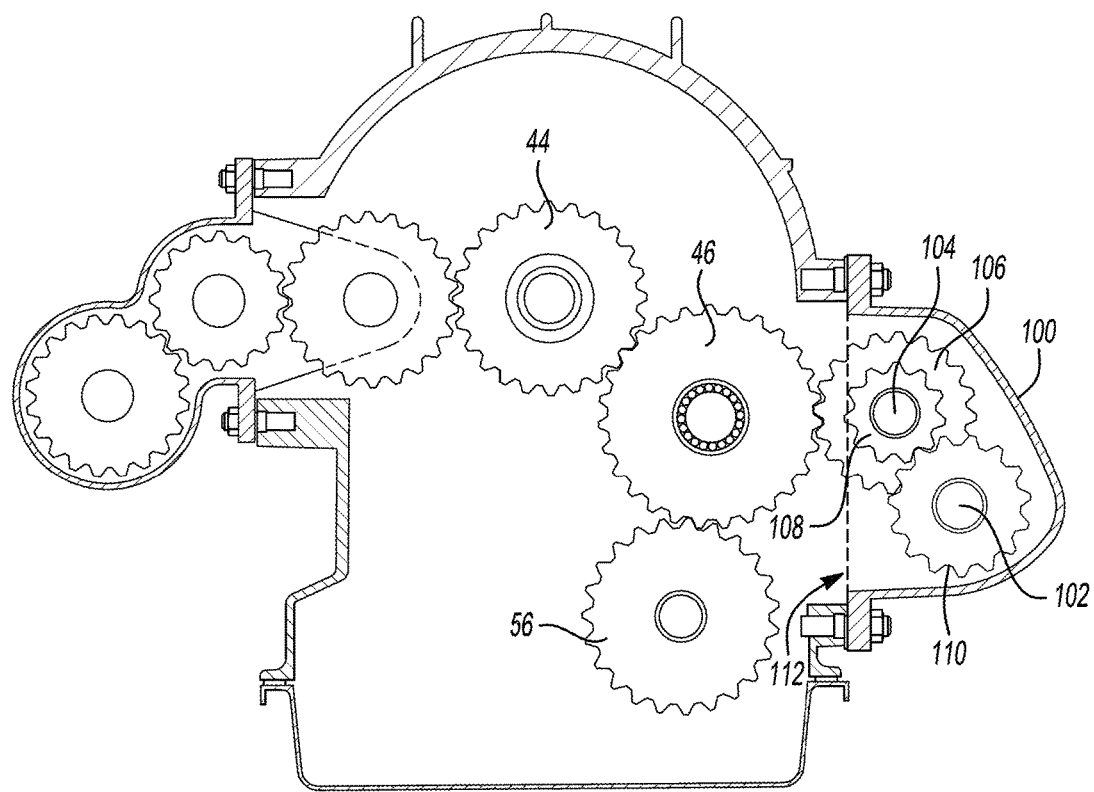
FIG. 3 is a schematic front view, in cross section, of another transmission and accessory drives along a cut line behind the torque converter.

Referring to FIG. 3, another PTO 100 includes an output shaft 102 disposed below the input shaft 104 and below the bottom of the window 112 to further reduce the width of the PTO. The PTO 100 is driveably connected to the primary drive gear 44 by an idler gear 46 as described above with regards to FIG. 2. Two components are driveably connected if they are connected by a power flow path that constrains their rotational speeds to be directly proportional. The PTO 100 may include a first gear 106 fixed to the input shaft 104 and including gear teeth in meshing engagement with the idler gear 46. A second gear 108 is also fixed to the input shaft 104 and includes gear teeth in meshing engagement with gear 110 fixed to the output shaft 102. During operation of the PTO 100, power is transferred from the primary drive gear 44 to the output shaft 102 in order to power the accessory. In an alternative embodiment, gear 104 and gear 106 are integrally formed and the input shaft is constrained from rotation by the PTO housing.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   a case;
   an input shaft;
   a primary drive gear fixed to the input shaft and having a first set of gear teeth;
   an idler gear having a second set of gear teeth in meshing engagement with the first set of gear teeth;
   a transmission-pump drive gear having a third set of gear teeth in meshing engagement with the second set of gear teeth to transmit power from the idler gear to a transmission pump; and
   a power take-off unit (PTU) mounted to the case and including:
      a PTU input shaft,
      a PTU output shaft,
      a first unit gear disposed on the PTU input shaft and having a fourth set of gear teeth in meshing engagement with the second set of teeth to transmit power from the idler gear to the PTU input shaft,
      a second unit gear disposed on the PTU input shaft and having a fifth set of gear teeth, and
      a third unit gear disposed on the PTU output shaft and having a sixth set of gear teeth in meshing engagement with the fifth set of gear teeth to transmit power from the PTU input shaft to the PTU output shaft.

2. The transmission of claim 1, wherein the a first unit gear has a larger diameter than the a second unit gear.

3. The transmission of claim 1 further comprising a second power take-off unit mounted to the case of the transmission and including a fourth unit gear having a seventh set of gear teeth in meshing engagement with the first set of gear teeth.

4. The transmission of claim 1, wherein the case defines a window and the first unit gear extends through the window to mesh with the idler gear.

5. A transmission comprising:
a primary drive gear fixed to an input shaft;
an idler gear meshing with the primary drive gear;
a transmission pump arranged to receive power from the idler gear; and
a power take-off unit mounted to a case of the transmission and including:
an input shaft having a first gear meshing with the idler gear and a second gear, and
an output shaft having a third gear meshing with the second gear.

6. The transmission of claim 5 further comprising a pump gear in meshing engagement with the idler gear and configured to transmit power to a pump shaft driveably connected to the transmission pump.

7. The transmission of claim 5 further comprising a torque converter including a turbine and an impeller fixed to the input shaft.

8. The transmission of claim 5, wherein the first gear has a larger diameter than the second gear.

9. The transmission of claim 5, wherein the first gear and the second gear are integrally formed.

10. The transmission of claim 5, wherein the first and second gears are fixed to the input shaft.

11. The transmission of claim 5, wherein the input shaft is supported for rotation by a housing of the power take-off unit.

12. The transmission of claim 5 further comprising a transmission case that houses the primary drive gear, the idler gear and the transmission pump, and a power take-off unit housing that mounts to the transmission housing, wherein the input shaft of the power take-off unit is external of the transmission housing.

13. The transmission of claim 12, wherein the case defines a window and the first gear extends through the window to mesh with the idler gear.

14. A transmission comprising:
a case defining a window and having a boss that surrounds the window;
a primary drive gear fixed to a transmission input shaft;
a transmission pump operably coupled to a pump gear; and
an idler gear meshing with the primary drive gear and the pump gear; and
an accessory drive unit mounted to the boss and including:
an input shaft having a first gear meshing with the idler gear and a second gear, and
an output shaft having a third gear meshing with the second gear.

15. The transmission of claim 14, wherein the first gear and the third gear overlap.

16. The transmission of claim 14, wherein the first gear extends through the window.

17. The transmission of claim 14, wherein the first gear and the second gear are integrally formed.

18. The transmission of claim 17, wherein the input shaft is rotationally fixed relative to a housing of the accessory drive unit.

* * * * *